United States Patent [19]

Chern et al.

[11] Patent Number: 5,082,337
[45] Date of Patent: Jan. 21, 1992

[54] FILTER DEVICE EMPLOYING A HOLOGRAPHIC ELEMENT

[75] Inventors: Mao-Jin Chern, Rancho Palos Verdes; John E. Wreede, Monrovia, both of Calif.

[73] Assignee: Hughes Aircraft Company, Los Angeles, Calif.

[21] Appl. No.: 285,135

[22] Filed: Dec. 16, 1988

[51] Int. Cl.$^5$ .......................... G02B 5/20; G02B 5/32
[52] U.S. Cl. ..................................... 359/15; 359/359; 359/890
[58] Field of Search .................. 350/3.7, 3.61, 3.6, 350/1.1, 1.6, 316, 3.77, 538

[56] References Cited

U.S. PATENT DOCUMENTS

| | | | |
|---|---|---|---|
| 3,695,744 | 10/1972 | Clay | 350/3.77 |
| 3,944,322 | 3/1976 | Benton | 350/3.85 X |
| 4,458,977 | 7/1984 | Arns et al. | 350/3.6 |
| 4,601,533 | 7/1986 | Moss | 350/3.77 |
| 4,637,678 | 1/1987 | Moss et al. | 350/3.7 |
| 4,755,012 | 7/1988 | Kojima | 350/1.1 |
| 4,779,942 | 10/1988 | Verney | 350/1.1 |
| 4,786,125 | 11/1988 | Magarinos et al. | 350/3.7 |
| 4,802,719 | 2/1989 | Magarinos et al. | 350/3.7 |
| 4,830,441 | 5/1989 | Chana | 350/3.7 |
| 4,863,224 | 9/1989 | Afian et al. | 350/3.6 |

OTHER PUBLICATIONS

Sincerbox, G. T. "Formation of Optical Elements by Holography", *IBM Technical Disclosure*, vol. 10, No. 3, Aug. 1967 pp. 267-268.

Macleod, H. A. *Thin-Film Optical Filters*, Macmillan, N.Y., 1986 pp. 234-237.

"Development of an Aviator's Night Vision Imaging System (ANVIS)", Efkeman, Jenkins, presented Jul. 28-Aug. 1, 1988, SPIE.

"Recommendations for Color Limitation of Illuminated Devices used in Connection with AN/AVS-6 Night Vision Goggles", B. D. McMains presented Oct. 19, 1983, SAE A-20A Subcommittee-Meeting #52.

"Compatibility of Night Vision Goggles with CRT Displays in a Helicopter Cockpit", L. C. Taylor.

"Accurate Light Measurement in Aircraft Cockpits", K. Miller, Electrooptics, pp. 26-30, Jul. 1983.

"Holographic Recording Materials", H. M. Smith, Springer Verlay, Chapter 3 1977.

"Volume Holography and Volume Gratings", L. Solymar, D. J. Cook, Academic Press, 1981 pp. 13-31 and 278-286.

"Principles of Holography", H. M. Smith, John Wiley and Sons, Inc., 2d ed. 1975, pp. 27-32, 76-81.

*Primary Examiner*—Rodney B. Bovernick
*Assistant Examiner*—David R. Parsons
*Attorney, Agent, or Firm*—Leonard A. Alkov; Wanda Denson-Low

[57] ABSTRACT

A filter device 10 and method of making the same is disclosed. The device comprises holographic means 12 for diffracting optical radiation of a first predetermined range of wavelengths, and optical radiation filter means 14 for filtering optical radiation of a second predetermined range of wavelengths. The optical radiation filter means is coupled with the holographic means.

20 Claims, 1 Drawing Sheet

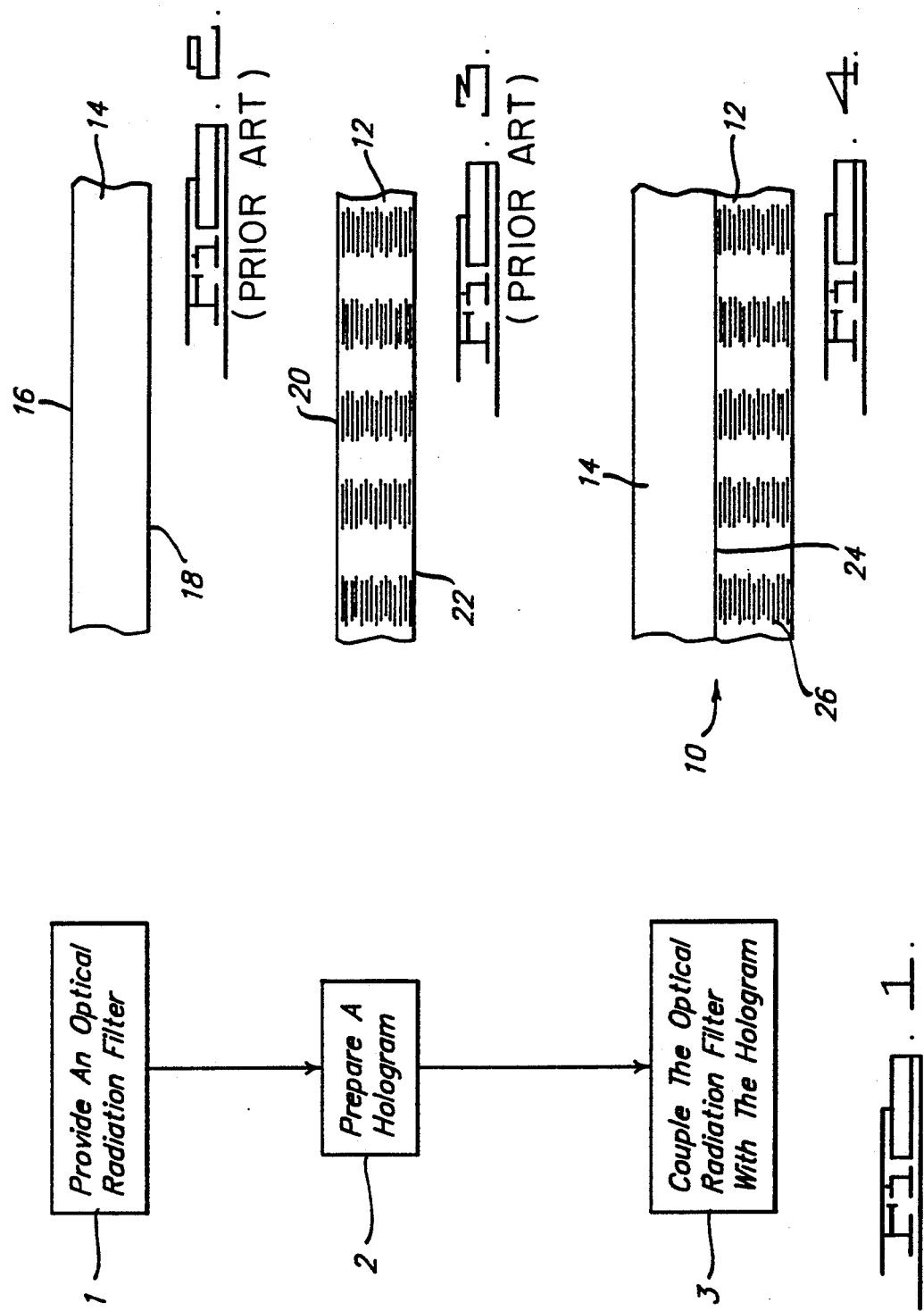

FILTER DEVICE EMPLOYING A HOLOGRAPHIC ELEMENT

TECHNICAL FIELD

This invention relates to filter devices. More particularly this invention relates to filter devices employing a holographic element.

BACKGROUND OF THE INVENTION

In recent years, there has been an increased demand in commercial and military applications for improved optical filter devices. For instance, in the area of night imaging systems, there has been an increased need felt to develop a filter assembly to enable simultaneous viewing of infrared images, and other select wavelengths of light, while discriminating against undesired optical radiation. As used herein, the term "night imaging system" refers to an optical system capable of intensifying images viewed under low light levels, e.g. nighttime conditions. Night imaging systems are popularly employed in aviation applications. An example of a night imaging system would be the ANVIS system (Aviator's Night Vision Imaging System), which is produced by Hughes Optical Products, Inc. The ANVIS system is a helmet-mounted unity power image intensified binocular that enhances vision under low light level conditions. A discussion of the ANVIS system can be found in Efkeman, Jenkins, *Development of an Aviator's Night Vision Imaging System (ANVIS)*, presented July 28–Aug. 1, 1988, SPIE International Technical Symposium and Exhibit.

When used in many aircraft applications, particularly military aircraft, unfiltered night imaging systems such as an unfiltered ANVIS system, suffer some disadvantages. For instance, the panel lights in many cockpits tend to overdrive the image intensifier in the imaging system. Design considerations for producing filter systems, such as those having a maximum visibility of about 530 nanometers (nm), for night imaging systems previously have been discussed. See e.g., B.D. McMains, *Recommendations for Color Limitation of Illuminated Devices used in connection with AN/AVS-6 Night Vision Goggles*, presented Oct. 19, 1983, SAE A-20A subcommittee - meeting No. 52.

It has been proposed as a solution to some of the problems encountered while using night imaging systems to implement a filter, such as a standard minus-blue filter, into a night imaging system. Minus-blue filters typically are suitable for filtering cockpit lighting, while still failing to substantially interfere with the viewing of outside imagery.

Unfortunately, the use of a minus-blue filter tends to inhibit viewing of images from cathode ray tubes (CRT), such as those found in head-up display units. This is largely due to a high attenuation of green light, emitted from the CRT, caused by the minus-blue filter. The typical attenuation is of a magnitude that, when using minus-blue filters, the CRT has to be employed at such high intensity levels that a useful image is not easily obtained.

One proposed solution to the problems encountered while using night imaging systems has been to implement a narrow band phosphor filter, and/or narrow band transmitting faceplate filter, to the CRT display. A complementary narrow band reflection filter can then be placed over the objective lens of an image intensifying goggle. See, L.C. Taylor, *Compatibility of Night Vision Goggles with CRT Displays in a Helicopter Cockpit*. Unfortunately, this approach tends to reduce the intensity of the CRT display to a relatively undesirable level for many applications.

It has further been proposed that a partially filtered imaging system be employed to reduce light transmission of a first wavelength, yet pass through light of a second wavelength. For instance, it has been suggested that a partially filtered imaging system be employed to reduce glare from cockpit lights, yet pass through infrared radiation and green light from a CRT, to permit viewing of a head-up display image.

One such imaging system might employ an input aperture having all but a small area which is covered by a filter. The filter is typically employed to reduce glare. The small unfiltered area, however, would pass light from the head-up display image.

The use of filter systems such as the Kodak Wratten filter system is known for applications requiring selective filtration. Unfortunately, the use of that system tends to be impractical for many applications requiring very sharp cutoffs and narrow band widths.

Finally, narrow band filters used alone or in combination with other such filters have been proposed to solve one or more of the above problems. A typical filter would be one such as a Schott BG-7B filter which is a broadband blue green transmitting filter. That filter typically has about a 60 nm transmission band. Unfortunately, because the head-up display transmits a more narrow band, i.e. about 20 nm, the relatively broad band of filters like the Schott BG-7B renders it unsuitable for many applications. That is, broader transmission bands of the filter introduce greater amounts of undesired light.

The need for a system that selectively transmits predetermined wavelengths of light has further been discussed in K. Miller, *Accurate Light Measurement in Aircraft Cockpits*, Electrooptics, pp. 26–30, July 1983.

SUMMARY OF THE INVENTION

A filter device and method of making the same is disclosed. Optical radiation filter means are provided for filtering radiation of a first predetermined range of wavelengths. Holographic means are provided for diffracting radiation of a second predetermined range of wavelengths. The optical radiation means is coupled with the holographic means.

Among the advantages of the present invention is that filter devices requiring precise and relatively sharp narrow band wavelength rejection can be produced more efficiently.

DESCRIPTION OF THE DRAWINGS

FIG. 1 is a flow diagram depicting the steps of forming a filter device according to the methods of the present invention;

FIG. 2 is a cross-section of an optical radiation filter;

FIG. 3 is a cross-section of a reflection hologram; and

FIG. 4 is a cross-section of a filter device of the present invention.

DESCRIPTION OF THE PREFERRED EMBODIMENT

While this invention is described in connection with a filter device suitable for aerospace cockpit applications, it should be recognized by one skilled in the art that a variety of devices, and methods of making the same, for non-aerospace cockpit applications are within the scope of the present invention.

The device 10 of the present invention comprises holographic means 12 disposed in a spaced relationship with optical radiation filter means 14. The optical radiation filter means 14, having a predetermined thickness, are provided for filtering incident radiation of at least a first predetermined range or band of wavelengths. As used herein, the expression "optical radiation filter" refers to a filter or combination of filters capable of filtering radiation of a predetermined range or band of wavelengths, and is not intended to be limited to filtering visible light radiation. The holographic means 12, having a predetermined thickness, are provided for diffracting radiation of at least a second predetermined range or band of wavelengths. Used in combination with each other, the optical radiation filter means and the holographic means transmit predetermined amounts of one or more predetermined wavelengths of radiation. Various results obtained by this unique combination have previously been unattainable using the present holographic means or optical radiation filter means singly.

In a highly preferred embodiment, it is preferred to produce a filter device 10, suitable for applications such as in aircraft cockpits, which comprises a hologram 12 and an optical radiation filter 14 disposed in a spaced relationship. The spacing between the optical radiation filter 14 and the hologram 10 ranges from as little as about zero inches to a distance limited only by operating and/or equipment limitations. Thus, it is contemplated that the optical radiation filter may be in contact with each other, or disposed in a system, such as an optical viewing system, so that they are separated by one or more suitable media, such as air.

The present preferred embodiment is described in connection with a filter device and method of making the same, for use to permit improved viewing of a night imaging systems which are employed in aircraft equipped with head-up display units. Thus, to facilitate optimal night vision and head-up display observation, while minimizing light from undesired sources, the filter device 10 of the present invention should preferably allow infrared radiation to pass unattenuated; filter substantially all cockpit light; and transmit at least at about 50% attenuation a narrow bandwidth of light of about 543 nm.

Referring to step 1 of FIG. 1 and FIG. 2, to prepare a filter device 10 according to the methods of the present invention, optical radiation filter means 14 having first and second surfaces 16 and 18, respectively, are provided for filtering optical radiation of at least a first predetermined range or band of wavelengths. Preferably, the optical radiation means comprise one or more ordinary band pass filters, i.e. optical radiation filters that filter light radiation of a predetermined range of wavelengths. In the present preferred embodiment, the filter means provided is a narrow band pass filter, such as a Schott BG-7B. That filter exhibits greater than about 60% transmission over a range of wavelengths of about 530–560 nm; and transmits substantially all infrared radiation.

The Schott BG-7B, as described for use in the present embodiment, preferably has a thickness of about one-eighth inch. The thickness dimension, however, may be varied to take into account various properties obtainable by varying filter thickness and will depend largely upon the application, and/or operating conditions, of the ultimate filter device 10.

Optical radiation filter means 14, which are suitable for the use in the present devices also include, without limitation, known band-pass filters, such as narrow and/or broad band-pass filters, and may suitably be absorption and/or interference filters. For instance, without limitation, the filters employed in the methods and devices of the present invention may be selected from those filters listed in Table I. The characteristics of the filters are described according to their approximate x and y coordinate values as they would appear if plotted on a known C.I.E. chromaticity diagram, which diagram is described in detail in B. D. McMains, *Recommendations for Color Limitation of Illuminated Devices Used in Connection with AN/AVS-6 Night Vision Goggles*, presented Oct. 19, 1983, SAE A-20A subcommittee—meeting No. 52, which is hereby expressly incorporated by reference. As explained by McMains, C.I.E. chromaticity diagrams display the relative wavelengths and purity of colored light as generated by an equal energy source.

TABLE I

| Filter | Coordinate Values x | Coordinate Values y | Tolerance ± |
|---|---|---|---|
| 1. Jay-E1 NVG Green 10620,10648, 10530,10732,30288 | .257 | .620 | .020 |
| 2. Jay-E1 52389 Ring Filter | .300 | .648 | .020 |
| 3. Jay-E1 10785 Switch | .287 | .675 | .020 |
| 4. Jay-E1 10785 Switch | .279 | .637 | .020 |
| 5. Jay-E1 52376 Lightplate Ring Filter | .317 | .630 | .020 |
| 6. Hoffman Lightplate Filter | .143 | .405 | |
| 7. Jay-E1 30380:LED w/Filter | .404 | .596 | .020 |
| 8. Wamco G1 + G1 + P3 (NV-02) | .132 | .417 | |
| 9. Wamco G1 + P3 (NV-01) | .129 | .438 | |
| 10. Schott BG-7B 3 MM | .23 | .467 | |
| 11. Corning 4-96 5 MM | .262 | .515 | |
| 12. Jay-E1 Switches (Blue) | .119 | .373 | .020 |
| 13. Jay-E1 Switches (Yellow) | .496 | .502 | .020 |
| 14. Canadian Marconi EL | .140 | .560 | |
| 15. Grime's ELCR-15 EL w/Filter | .190 | .686 | |
| 16. Korry NVG Green | .219 | .629 | |
| 17. Schott BG-18 3 MM | .282 | .505 | |
| 18. Grimes ELCR-15 with Lea Filter | .142 | .641 | |
| 19. Grimes ELCR-15 at 115 VAC 400 HZ | .190 | .424 | |
| 20. Jay-E1 AHIP EL | .200 | .490 | |
| 21. Kopp #3 Glass 3 MM | .220 | .450 | |
| 22. US Army Research & Development Command EL | .210 | .470 | .070 |
| 23. US Army Research & Development Command EL | .160 | .070 | .050 |
| 24. US Army Research & Development Command EL | .530 | .460 | .030 |
| 25. Jay-E1 Composite Plastic Filter | .332 | .628 | |
| 26. Jay-E1 52351 or 30379 Filter | .283 | .629 | .020 |
| 27. SAE ARP 922 Blue EL 400 HZ 150 VAC | .169 | .229 | |
| 28. SAE ARP 922 Green EL 400 HZ 150 VAC | .250 | .517 | |
| 29. SAE ARP 922 Yellow EL 400 HZ 150 VAC | .534 | .463 | |

As can be seen, however, when used singly, the above optical radiation filter means 14 likely fail to filter some wavelengths of radiation, thereby rendering the filter means unsuitable for many applications. For instance, in the context of aircraft cockpit applications where night imaging systems are employed in addition to head-up display units, use of a filter singly such as the use of a Schott BG-7B filter singly, is less preferred because the Schott BG-7B tends to transmit too much undesired light having a wavelength of about 543 nm, thereby tending to overdrive the night imaging system's intensifier.

Thus, referring to step 2 of FIG. 1, and FIG. 3, holographic means having first and second surfaces 20 and 22 respectively are provided, such as by preparing holographic means, for use in combination with the optical radiation filter means 14. As seen in step 3 of FIG. 1 and FIG. 4, the optical radiation filter means 14 are coupled, i.e. combined with, the holographic means 12. The optical radiation filter means 14 can be coupled with the holographic means 12 so that the space maintained between them is as little as about zero inches. The holographic means 12 is provided for diffracting radiation of at least a second predetermined band of range or wavelengths. More particularly, when combined with the optical filter means 14, the holographic means 12 facilitates trimming or narrowing of the bandwidth of a source of incident light, as well as reducing the amount of transmission of such light to a predetermined level.

Preferably, the optical radiation filter means 14 is coupled with the holographic means 12 by adjoining the optical radiation filter means with the holographic means 12 using a suitable adhesive at an interface 24, defined by the second surface of the optical radiation filter means and the first surface of the holographic means. An example of a suitable optical adhesive is Norland Optical Cement NOA 61, which is an ultraviolet curable polyurethane-containing compound.

Preferably, the second surface 18 of the optical radiation means is disposed adjacent and conterminous with the first surface 20 of the holographic means. It should be recognized, however, that a variety of combinations of optical filters and holograms are obtainable according to the methods and devices of the present invention. Thus, it is within the scope of methods and devices of the present invention to form holographic means 12 directly upon the second surface 18 of the optical radiation filter means. Alternatively, it is possible to employ additional layers between said optical radiation means. For instance, it is contemplated that a clear protective layer such as a clear gelatin layer, or other suitable layer, may be employed between the optical radiation means 14 and the holographic means 12. Further, it is within the scope of the present methods and devices that the holographic means 12, and optical radiation filter means 14, which are disposed in a spaced relationship with each other, are separated for a predetermined distance by a suitable medium, such as air.

The preferred holographic means 12 employed in the present invention is a reflection hologram, and more preferably a zero-angle reflection hologram. That is, the preferred holographic means is a hologram having an interference pattern 26 (i.e. fringes) recorded in the hologram substantially parallel to the first and second surfaces 20 and 22 of the hologram. The fringes are thus at approximately a zero degree angle with respect to the first and second surfaces of the hologram. It is appreciated, however, that fringes having different angular dispositions may be formed and used in the holograms according to the methods and devices of the present invention. Thus, other holographic means include . without limitation reflection and/or transmission holograms of the type including volume holograms, surface holograms, phase holograms, and/or amplitude holograms.

The preferred hologram 12 is substantially flat and the first and second surfaces 20 and 22 are substantially parallel to each other. With some basic modification to the methods of the present invention, it is also possible to produce a filter device on a curved substrate surface. Further, it is also within the contemplation of the methods and devices of the present invention that multiple layer holograms may be employed as holographic means. A description of such multiple layer holograms and method of preparing the same is disclosed in commonly assigned co-pending U.S. Pat. application Ser. No. 07/207,084 "High Efficiency Holograms by Multiple-layer Holography", which is hereby expressly incorporated by reference.

The fringes of the present preferred hologram are spaced at one or more predetermined distances with respect to each other and with respect to the first and second surfaces 20 and 22 of the hologram to reflect one or more predetermined range of wavelengths. The effect of such reflection is to reduce the transmission of radiation, such as light having a relatively narrow bandwidth, through the hologram. It is appreciated that the fringe spacing employed in the methods and devices of the present invention may be varied to many suitable distances in order to affect the transmission of incident radiation. In the present preferred embodiment, the fringes are preferably spaced to diffract light having wavelengths ranging from about 550nm to about 580nm.

Thus, according to the methods and devices of the present invention, holographic means 12 can be provided to diffract a more narrow bandwidth of radiation than previously obtainable using an optical filter singly. Holographic means of the present preferred embodiment preferably has a thickness of about 0.001 inches.

It will be appreciated by one skilled in the art that with some modification to the methods and devices of the present invention, the ranges of wavelengths filtered by the devices of the present invention may be selected and varied to suit particular applications where selective transmission of one or more particular wavelengths is desired.

The filter device 10 of the present invention thus takes advantage of relatively precise diffraction properties obtainable by using holograms to trim, e.g. "fine tune", an optical radiation filter, such as the Schott BG-7B, when, the hologram and the optical radiation filter are used in combination with each other.

A completed filter device 10, such as the one described above, which comprises an optical radiation filter in face-to-face combination with a hologram will preferably have a thickness of about one-eight (⅛) inches. One skilled in the art will appreciate, however, that device thickness can be varied by varying the thicknesses of the optical radiation filter 14 and/or the hologram 12, wherein by varying the thickness it is possible to vary the characteristics of the filter device 10. Further, the spaced relationship maintained between the hologram and the optical radiation filter may be such that the hologram and optical radiation filter are separated for a predetermined distance by a suitable medium, such as air. This latter embodiment can be accomplished in any suitable manner, including fixably positioning the optical radiation filter at a predetermined distance from the hologram using suitable mechanical means.

The completed optical filter device 10 can be fitted to a variety of imaging systems, such as an ANVIS system, using suitable fitting means such as a cover glass for the objective lens in that system.

Filter devices 10 prepared according to the methods of the present invention may be employed in many applications where the transmission of a narrow band of radiation, such as light, of a relatively precise range of wavelengths is desired. For instance, the present filter devices may be employed in applications where transmission of a narrow band of light is desired in order to simulate monochromatic light.

Further, various combinations of filters and holograms may optionally be employed, including, without limitation, filter combinations such as those comprising a narrow band interference filter and a holographic reflection filter; a broad band interference filter and a holographic reflection filter; a broad band absorption interference filter and a holographic reflection filter; or any other combination where it is desired to narrow the transmission range of a filter by a relatively small amount.

One skilled in the art should realize that the methods and devices of the present invention can be varied to accommodate operating conditions of various applications, and are not limited in scope to aircraft cockpit applications. For instance, without limitation, devices of the present invention may be employed anywhere the filter device is desired to have a sharper cut-off than normal, and where the transmission is narrower than normal.

The filter device 10 of the present invention preferably is prepared by providing an optical radiation filter 14 of a predetermined thickness, having a first surface 16 and a second surface 18, capable of filtering optical radiation of at least a first predetermined range of wavelengths; providing a hologram 12 of a predetermined thickness, having a first surface 20 and a second surface 22, capable of diffracting radiation of at least a second predetermined range of wavelengths; and coupling the first surface 20 of said hologram 12 with the second surface 18 of said optical radiation filter 14.

Various optical radiation filters are suitable for employment in the methods and devices of the present invention and include, without limitation, narrow and/or broad band-pass filters; and may suitably be absorption and/or interference filters, or combinations thereof.

To prepare a filter device 10 of the present embodiment, such as one for use in aircraft cockpits where night imaging systems are used in addition to head-up display units, preferably, the optical filter provided will have a thickness of about ⅛ inch. The filter should preferably be substantially flat, although it is appreciated that, in many applications, filters having a curvature may suitably be employed.

The hologram is provided preferably by preparing a hologram according to any method capable of yielding preferred diffraction characteristics for the desired application.

One preferred method of preparing a hologram for employment in the devices of the present invention is summarily described as the steps of processing an exposed interference pattern in a photosensitive layer, which layer has been coated on a suitable substrate, to form a hologram. The following is a more detailed description which makes reference, to a large extent, to a number of steps which are known in the art and are summarized in H. M. Smith, *Principles of Holography*, John Wiley and Sons, Inc., p.p. 27-32, and p.p. 76-81, 2d ed. 1975.; and H. M. Smith, Holographic Recording Materials, Springer Verlay, Chapter 3, 1977, which are hereby expressly incorporated by reference.

The hologram prepared according to the methods described herein is preferably a reflection-type hologram having substantially zero degree fringes. That is, the interference pattern recorded as the hologram is substantially parallel to the first and second surfaces 20 and 22 of the hologram 12.

The holograms of the present invention preferably should be prepared to avoid producing noise holograms. Noise holograms, which arise partly due to "airglass" interface reflection, i.e. the reflection occuring during hologram exposure due partly to the interface between the recording medium and air. Noise holograms are undesirable for at least two reasons. First, reflection-type noise holograms typically generate an undesired reflection color for the hologram. Second, transmission type noise holograms tend to generate an undesirable rainbow-like blurring and distortion of imagery obtained using the hologram.

Thus, to prepare a hologram that is substantially noise free, a suitable holographic recording medium having a predetermined thickness is provided. Preferably the recording medium is substantially flat. However, the dimensions and shape of the recording medium are limited only by practical considerations, including manufacturing equipment and ultimate use for the completed hologram. Preferably, the recording medium is prepared by coating a photosensitive layer, preferably a sensitized dichromated gelatin layer, onto a major surface of a suitable substrate. Various coating methods may be suitably employed and include cast coating, doctor blade coating, spray coating, dip coating, and resin coating.

Suitable substrates include a front surfaced mirror in applications where it is preferred that the gelatin layer is ultimately peeled off. Other substrates may be employed and include without limitation, transparent substrates such as thin glass plates which are index matched to a mirror during subsequent holographic exposure steps, photographic grade mylar, polycarbonate, polyester, and cellulose acetate. Further, it is possible to employ the optical radiation filter 14 as the present substrate.

In a number of applications, a plurality of spacers should preferably be disposed on the major surface of the substrate. The spacers serve to support the preferred gelatin layer during exposure. Suitable spacers include glass beads in a urethane matrix, steel balls or the like.

Preferably, the spacers that are employed are separated from each other by a distance of about 0.040 inches. The spacers preferably support the layer and are index matched to the layer with a suitable index matching fluid such as mineral oil. Alternative index matching fluids include, without limitation, xylene, and microscope immersion fluid.

Alternate methods of avoiding production of noise holograms, such as those generated in part by air-glass interface reflection include, in addition to using the above method of index matching, coating the substrate with an antireflective (AR) coating; adding an antireflective coated cover glass which is itself index matched to the substrate; moving an AR-coated cover glass with respect to the substrate during holographic exposure as disclosed in U.S. Pat. No. 4,458,977 which is hereby expressly incorporated by reference; using a suitable complex prism assembly to facilitate prevention of undesirable reflections from reaching the hologram; or using a scanning exposure laser beam with a beam diameter small enough to avoid the possibility that a reflected beam generated by an exposure beam will overlap (and interfere with) the primary beam generated by the exposure beam.

After preparing the substrate for exposure using known techniques, including a step of drying the recording medium to a predetermined moisture content, a hologram is exposed in the recording medium using conventional methods to form holographic fringes 26. For instance, a suitable method of exposing holographic fringes is described in L. Solymar, D. J. Cook, *Volume Holography and Volume Grating*, Academic Press, pp. 13-31, 1981, which is hereby expressly incorporated by reference.

To summarize a procedure for exposing a hologram, a holographic exposure is preferably made using a substantially collimated laser light beam. The collimated beam comprises a first entering beam. A reflection caused by the first beam off a mirror, or other suitable reflective medium which is preferably associated with the substrate provides a second beam necessary for holographic recording. The beams are provided at one or more predetermined exposure levels. For the present embodiment, the preferred exposure level is about 150 millijoules/cm$^2$.

The beams are introduced into the recording medium at one or more predetermined angles of illumination. The angle of illumination is largely dependent on the particular dichromated gelatin being used and the wavelength of laser light being used. For example, for a standard 300 bloom porkskin gelatin and 514.5nm argon laser, the preferred angle of illumination is about 28 degrees. Optionally, to facilitate holographic exposure it should be appreciated that specialized anti-reflective coatings may be employed, i.e. coatings that exhibit lower reflectivity at a particular angle or wavelength such as standard multilayer interference coatings, $\frac{1}{4}$-wavelength magnesium fluoride coatings, or Vee coatings. The holographic fringes that are formed in the recording medium are areas of high and low indices of refraction corresponding in space to the interference pattern formed at the intersection of the two coherent beams supplied by the laser.

After exposure, the hologram is preferably processed by employment of conventional holographing processing steps. For instance, the steps of processing the preferred dichromated gelatin are known in the art and are described in L. Solymar, D. J. Cook, *Volume Holography and Volume Grating;* Academic Press, pp. 278-286, 1981, which is hereby expressly incorporated by reference. Briefly, a typical process comprises the steps of removing substantially all remaining index matching fluid from the preferred gelatin by employment of suitable solvents such as freon, hexane, or freon-alcohol mixtures. The gelatin is then swollen by soaking it in a suitable solution, such as one containing about 30 millimolar triethanol amine. This step also serves an additional purpose of removing excess dichromate from the gelatin. The solution is preferably rapidly removed by dehydration steps, such as by soaking the preferred gelatin in consecutive baths having an increasing concentration of from about 75 volume percent to about 100 volume percent of isopropyl alcohol in water.

After processing, the hologram 12 is preferably heated at one or more predetermined temperatures for one or more predetermined lengths of time to generate one or more predetermined wavelengths of peak reflectivity in the hologram. Preferably, the hologram is heated at a temperature of about 60° C. to about 120° C. until the thickness of the gelatin (hence the wavelength of peak reflectivity) is substantially stable. In the present preferred embodiment, this step entails baking the hologram at about 100° for about two weeks to yield a hologram suitable for diffracting a range of wavelengths suitable for applications employing a head-up display unit in connection with a night imaging system such as the ANVIS system; i.e. a hologram exhibiting a peak reflectivity of light having a range of wavelengths of about 550 to about 580 nm, having a bandwidth of about 25nm to about 30nm.

If the wavelength at normal is not within these ranges, suitable remedial measures can be taken to obtain such wavelength and include adjusting the angle of hologram exposure.

After obtaining the predetermined wavelength within the hologram, the hologram 12 is optionally sealed with a suitable sealing layer to protect it from contamination such as moisture. Preferably, this can be done by attaching one or more of the hologram's surfaces to a clear cover glass. Preferably, the clear cover glass is attached to the surfaces of the hologram using suitable optical adhesives such as Norland Optical Cement NOA 61.

The first surface 20 of the hologram 12 can then be attached to the second surface 18 of the optical radiation filter 14. Preferably, the first surface 20 of the hologram 12 is attached to the second surface 18 of the optical radiation filter using a suitable optical adhesive, such as Norland Optical Cement NOA 61.

It should be appreciated that if the optional clear cover glass is omitted, the first surface 20 of the hologram 12 could be attached directly to the second surface 18 of the optical radiation filter 14. For instance, the first surface 20 of the hologram 12 could be attached directly to the second surface 18 of the optical radiation filter 14 using a suitable adhesive, such as Norland Optical Cement NOA 61, to form an optical filter device 10.

It is also contemplated that a hologram may be prepared utilizing a preferred optical radiation filter, such as those described above, as the hologram's substrate, thereby avoiding any need to adhere the filter to the hologram using adhesive. Further, if the hologram and optical radiation filter are separated for a predetermined distance by a suitable medium such as air, the hologram and optical radiation filter may be coupled in any suitable manner. For instance, suitable mechanical means may be employed to fixably position the optical radiation filter at a predetermined distance from the hologram.

Devices prepared according to the present process should exhibit approximately 30% peak transmission at about 543nm with a bandwidth of about 15nm thereby rendering them suitable for use with night imaging systems in aircraft cockpits having head-up display units therein.

It should be understood that while this invention has been described in connection with one presently preferred example, that other modifications will be apparent to those skilled in the art after a study of the specification, drawings, and following claims.

What is claimed is:

1. A filter device comprising:
   (a) non-holographic optical radiation filter means for filtering optical radiation of a first predetermined range of wavelengths and allowing infrared radiation to pass substantially unattenuated; and (b) holographic means for diffracting optical radiation of a second predetermined range of wavelengths and allowing infrared radiation to pass substantially unattenuated, said holographic means coupled with said nonholographic optical radiation filter means to form a filer device that transmits a narrow bandwidth of light at a third predetermined range of wavelengths.

2. A filter device according to claim 1, wherein said holographic means comprises a plurality of holograms.

3. A filter device according to claim 1, wherein said hologram is a reflection-type hologram.

4. A filter device according to claim 3, wherein said hologram has fringes therein spaced to diffract light having wavelengths ranging from about 550nm to about 580nm.

5. A filter device according to claim 1, wherein said non-holographic optical radiation filter means comprises a band-pass filter.

6. A filter device according to claim 5, wherein said band-pass filter is a narrow-band band-pass filter.

7. A filter device according to claim 5, wherein said band-pass filter is a broad-band band-pass filter.

8. A filter device according to claim 1, wherein said non-holographic optical radiation filter means exhibits greater than about 60% transmission over a range of wavelengths of about 530 to about 560 nm.

9. A method for manufacturing a filter device, said method comprising the steps of:

(a) providing a non-holographic radiation filter, having at least first and second surfaces, said non-holographic optical radiation filter being capable of filtering optical radiation of a first predetermined range of wavelengths and allowing infrared radiation to pass substantially unattenuated;

(b) providing a hologram, having at least first and second surfaces, said hologram being capable of diffracting optical radiation of a second predetermined range of wavelengths and allowing infrared radiation to pass substantially unattenuated; and (c) coupling said hologram with said optical filter to form a filter device that transmits a narrow bandwidth of light at a third predetermined range of wavelengths.

10. A method according to claim 9, wherein said providing step (a) comprises providing a band-pass filter.

11. A method according to claim 10, wherein said providing step (a) comprises providing a narrow-band band-pass filter.

12. A method according to claim 10 wherein said providing step (a) comprises providing a broad-band band-pass filter.

13. A method according to claim 10, wherein said providing step (a) comprises providing a band-pass filter that exhibits greater than about 60% transmission over a range of wavelengths of about 530-560 nm.

14. A method according to claim 9, wherein said providing step (b) comprises the steps of:
(1) providing a substrate;
(2) coating said substrate with a photosensitive material to form a photosensitive layer;
(3) exposing an interference pattern in said photosensitive layer; and
(4) processing said photosensitive layer to form a hologram.

15. A method according to claim 9, wherein said providing step (a) comprises preparing a reflection hologram having a peak reflectivity of light having a range of wavelengths of about 550nm to about 580nm.

16. A method according to claim 9, wherein said coupling step (c) comprises adhering the first surface of said hologram to the second surface of said optical radiation filter with an optical adhesive.

17. A method according to claim 16, wherein said coupling step (c) further comprises sealing said hologram with a sealing layer prior to attaching the first surface of said hologram to the second surface of said optical radiation filter.

18. A method for manufacturing a filter device, said method comprising the steps of:

(a) providing a non-holographic optical radiation filter, having at least first and second surfaces, capable of exhibiting greater than about 60% transmission over a range of wavelengths of about 530 nm to about 560 nm, and capable of transmitting substantially all infrared radiation;

(b) providing a hologram, having at least first and second surfaces, capable of diffracting optical radiation of light having a wavelength in a range of about 550nm to about 580nm; and (c) coupling said hologram with said optical filter to form a filter device that exhibits approximately 30% peak transmission at about 543nm with a bandwidth of about 15nm.

19. A method according to claim 18, wherein said providing step (b) comprises:
(1) providing a substrate;
(2) coating said substrate with a photosensitive material to form a photosensitive layer;
(3) exposing an interference pattern in said photosensitive layer; and
(4) processing said photo sensitive layer to form a reflection hologram.

20. A method according to claim 18 wherein said coupling step (c) comprises adhering the first surface of said hologram to the second surface of said optical radiation filter with an optical adhesive.

* * * * *